US011592524B2

(12) United States Patent
Chen et al.

(10) Patent No.: US 11,592,524 B2
(45) Date of Patent: Feb. 28, 2023

(54) COMPUTATION OF THE ANGLE OF INCIDENCE OF LASER BEAM AND ITS APPLICATION ON REFLECTIVITY ESTIMATION

(71) Applicant: Waymo LLC, Mountain View, CA (US)

(72) Inventors: Mingcheng Chen, Sunnyvale, CA (US); Christian Lauterbach, Campbell, CA (US); Blaise Gassend, East Palo Alto, CA (US); Nathaniel Quillin, Palo Alto, CA (US); Luke Wachter, San Francisco, CA (US); Gil Shotan, San Francisco, CA (US); Mark Alexander Shand, Palo Alto, CA (US)

(73) Assignee: Waymo LLC, Mountain View, CA (US)

(*) Notice: Subject to any disclaimer, the term of this patent is extended or adjusted under 35 U.S.C. 154(b) by 1001 days.

(21) Appl. No.: 16/236,780

(22) Filed: Dec. 31, 2018

(65) Prior Publication Data
US 2020/0142032 A1 May 7, 2020

Related U.S. Application Data

(60) Provisional application No. 62/754,953, filed on Nov. 2, 2018.

(51) Int. Cl.
*G01C 3/08* (2006.01)
*G01S 7/48* (2006.01)
(Continued)

(52) U.S. Cl.
CPC .......... *G01S 7/4802* (2013.01); *G01S 7/4808* (2013.01); *G01S 17/42* (2013.01); *G01S 17/931* (2020.01); *H04W 4/40* (2018.02)

(58) Field of Classification Search
CPC .... G01S 7/4802; G01S 7/4808; G01S 7/4861; G01S 7/4868; G01S 17/06; G01S 17/42; G01S 17/89; G01S 17/931; H04W 4/40
See application file for complete search history.

(56) References Cited

U.S. PATENT DOCUMENTS

| 5,086,411 | A  | * | 2/1992 | Dalglish  | G01S 17/06 |
|           |    |   |        |           | 356/3.01   |
| 9,043,069 | B1 | * | 5/2015 | Ferguson  | G06T 7/215 |
|           |    |   |        |           | 701/23     |

(Continued)

FOREIGN PATENT DOCUMENTS

| CN | 106291505 B | * | 7/2018 |
| CN | 109407112 A | * | 3/2019 |

(Continued)

OTHER PUBLICATIONS

"Jeong and Kim, "LiDAR Intensity Calibration for Road Marking Extraction, Jun. 2018, p. 455-460"" (Year: 2018).*
"Khan et al., "Modeling Laser Intensities For Simultaneous Localization and Mapping", 2016, IEEE Robotics and Automation Letters vol. 1, No. 2, p. 692-699" (Year: 2018).*

(Continued)

*Primary Examiner* — Samantha K Nickerson
(74) *Attorney, Agent, or Firm* — McDonnell Boehnen Hulbert & Berghoff LLP

(57) ABSTRACT

Methods and systems for laser point clouds are described herein. The method and system may include receiving, at a computing device, lidar data indicative of an environment of a vehicle from a first lidar data source, where the lidar data includes a first plurality of data points indicative of locations of reflections from the environment and further includes a respective intensity for each data point. The method and system also include determining a first surface normal for at least a first data point of the first plurality of data points. The (Continued)

method and system further includes determining a first angle of incidence for the first data point based on the surface normal. Additionally, the method and system includes adjusting the intensity of the first data point based on the first angle of incidence to create a first adjusted intensity for the first data point.

20 Claims, 13 Drawing Sheets

(51) Int. Cl.
*H04W 4/40* (2018.01)
*G01S 17/42* (2006.01)
*G01S 17/931* (2020.01)

(56) References Cited

U.S. PATENT DOCUMENTS

| | | | |
|---|---|---|---|
| 9,285,230 B1* | 3/2016 | Silver | G01S 13/86 |
| 10,107,899 B1 | 10/2018 | Han | |
| 10,593,042 B1* | 3/2020 | Douillard | G01S 7/4802 |
| 11,079,492 B1* | 8/2021 | Stumm | G01C 21/3833 |
| 2007/0257216 A1 | 11/2007 | Withers et al. | |
| 2009/0268965 A1 | 10/2009 | Mita et al. | |
| 2014/0152971 A1 | 6/2014 | James | |
| 2015/0002662 A1 | 1/2015 | Furihata et al. | |
| 2015/0309176 A1* | 10/2015 | Johnson | G01S 17/88 356/5.01 |
| 2016/0327647 A1* | 11/2016 | Herbst | G01C 15/002 |
| 2017/0131403 A1* | 5/2017 | Lin | G01S 17/08 |
| 2017/0193312 A1 | 7/2017 | Ai | |
| 2018/0136321 A1 | 5/2018 | Verghese | |
| 2018/0364717 A1* | 12/2018 | Douillard | G06T 7/11 |
| 2019/0156485 A1* | 5/2019 | Pfeiffer | G06V 20/56 |

FOREIGN PATENT DOCUMENTS

| | | | | |
|---|---|---|---|---|
| DE | 102018115372 A1 * | 12/2018 | | G01S 17/42 |
| JP | H08-160137 A | 6/1996 | | |
| JP | 2007-503582 A | 2/2007 | | |
| JP | 2008-292365 A | 12/2008 | | |
| JP | 2015-010845 A | 1/2015 | | |
| WO | WO-2018102190 A1 * | 6/2018 | | G01S 17/26 |

OTHER PUBLICATIONS

"Kashani et al. "A Review of LIDAR Radiometric Processing: From Ad Hoc Intensity Correction to Rigorous Radiometric Calibration", 2015, Sensors 2015,15, p. 28099-28128" (Year: 2015).*
"Jutzi et al. "Intensity Normalization by Incidence Angle and Range of Full-Waveform LIDAR Data", 2008, The International Archives of the Photogrammetry, Remote Sensing and Spatial Information Sciences. vol. XXXVII. Part B4, p. 405-412" (Year: 2008).*
"Vain et al. "Use of Naturally Available Reference Targets to Calibrate Airborne Laser Scanning Intensity Data", 2009, Sensors 2009,9 p. 2780-2796" (Year: 2009).*
"Yan et al. "Radiometric Correction and Normalization of Airborne LiDAR Intensity Data for Improving Land-Cover Classification", 2014, IEEE Transactions on Geoscience and Remote Sensing, vol. 52, No. 12, p. 7658-7673" (Year: 2014).*
"You et al. "Quantifying the Effects of Normalisation of Airborne LiDAR Intensity on Coniferous Forest Leaf Area Index Estimations", 2017, Remote sensing 2017, 9, 163, p. 1-17" (Year: 2017).*
Jutzi, B. et al., "Normalization of lidar intensity data based on range and surface incidence angle, Sep. 2009, p. 213-218" (Year: 2009).*
Gross, B. Jutzi, H; Normalization of Lidar Intensity Data Based on Range and Surface Incidence Angle; Bretar F, Pierrot-Deseilligny M, Vosselman G (Eds) Laser scanning 2009, IAPRS, vol. XXXVIII, Part 3/W8—Paris, France, Sep. 1-2, 2009; p. 213-218.
Schaer, J., et al.; Accuracy Estimation for Laser Point cloud Including Scanning Geometry.
Fang, Wei, et al.; Intensity Correction of Terrestrial Laser Scanning Data by Estimating Laser Transmission Function; IEEE Transactions on Geoscience and Remote Sensing; Jul. 2014; p. 1-10.
Kaasalainen, Sanna, et al.; Analysis of Incidence Angle and Distance Effects on Terrestrial Laser Scanner Intensity: Search for Correction Methods; Remote Sensing 2011; ISSN 2072-4292.
Kashani, Alireza G.; A Review of LIDAR Radiometric Processing: From Ad Hoc Intensity Correction to Rigorous Radiometric Calibration; Sensors 2015; ISSN 1424-8220.
International Search Report for corresponding PCT application No. PCT/US2019/055775 dated Jan. 30, 2020.
Jeong et al. "LiDAR Intensity Calibration for Road Marking Extraction", 15th International Conference of Ubiquitous Robots, Jun. 30, 2018.

* cited by examiner

COMPUTATION OF THE ANGLE OF INCIDENCE OF LASER BEAM AND ITS APPLICATION ON REFLECTIVITY ESTIMATION

The present disclosure is a continuation of U.S. Patent Application No. 62/754,953, filed on Nov. 2, 2018, entitled "Computation of the Angle of Incidence of Laser Beam And Its Application on Reflectivity Estimation," the entire contents of which are herein incorporated by reference as if fully set forth in this description.

BACKGROUND

Unless otherwise indicated herein, the materials described in this section are not prior art to the claims in this application and are not admitted to be prior art by inclusion in this section.

A vehicle may navigate a path of travel using information provided by sensors. A computing device of the vehicle may process information received from vehicle sensors to avoid obstacles and ensure proper navigation. Such vehicles are typically equipped with various types of sensors in order to detect objects in the surroundings. For example, an autonomous vehicle may include lasers, sonar, RADAR, cameras, and other devices which scan and record data from surroundings of the vehicle. Sensor data from one or more of these devices may be used to detect objects and their respective characteristics (position, shape, heading, speed, etc.). This detection and identification is useful for the safe operation of autonomous vehicle.

SUMMARY

The present application discloses embodiments that relate to methods and systems for object detection using laser point clouds.

In one example, the present application describes a method. The method may include receiving, at a computing device, lidar data indicative of an environment of a vehicle from a first lidar data source, where the lidar data includes a first plurality of data points indicative of locations of reflections from the environment and further includes a respective intensity for each data point. The method also include determining a first surface normal for at least a first data point of the first plurality of data points. The method further includes determining a first angle of incidence for the first data point based on the surface normal. Additionally, the method includes adjusting the intensity of the first data point based on the first angle of incidence to create a first adjusted intensity for the first data point.

In still another example, the present application describes a system. The system includes at least one processor. The system also includes a first laser unit configured to transmit and receive laser signals. Additionally, the system also includes a memory having stored thereon executable instructions that, upon execution by the at least one processor, cause the system to perform functions. The functions include creating a set of intensity-adjusted lidar data, wherein the intensity adjustments are based on the first angle of incidence for each respective data point.

In another example, the present application describes a non-transitory computer readable medium having stored thereon executable instructions that, upon execution by a computing device, cause the computing device to perform functions. The functions include receiving, at a computing device, lidar data indicative of an environment of a vehicle from a first laser unit, where the lidar data includes a first plurality of data points each data point having a respective intensity. The functions also include determining a surface normal for a first respective data point of at least a subset of the first plurality of data points. Additionally, the functions include determining an angle of incidence for the first respective data point based on the surface normal. The functions yet further include adjusting the intensity of the first respective data point based on the angle of incidence to create a first adjusted intensity.

In another example, a system is provided that comprises a means for adjusting laser point cloud intensity. The system also includes means for receiving, at a computing means, lidar data indicative of an environment of a vehicle from a first lidar data source, where the lidar data includes a first plurality of data points indicative of locations of reflections from the environment and further includes a respective intensity for each data point. The system also includes means for determining a first surface normal for at least a first data point of the first plurality of data points. The system further includes means for determining a first angle of incidence for the first data point based on the surface normal. Additionally, the system includes means for adjusting the intensity of the first data point based on the first angle of incidence to create a first adjusted intensity for the first data point.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
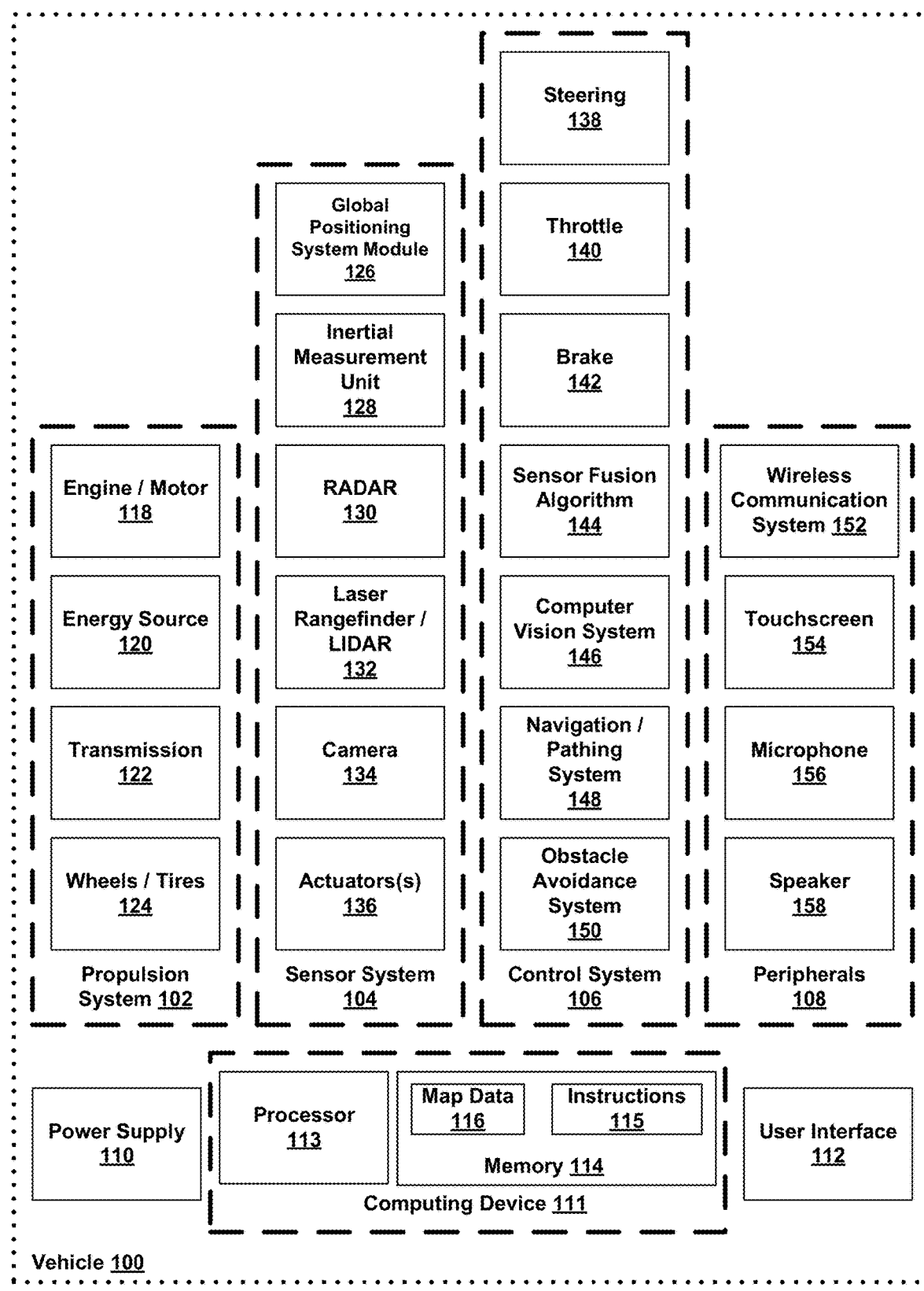
FIG. 1 is a simplified block diagram of an example vehicle, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

A vehicle, such as an autonomous or driverless vehicle, may navigate a path of travel without requiring a driver to provide guidance and control. To enable safe, autonomous navigation, a vehicle may utilize data about the local environment surrounding the vehicle acquired from sensors associated with the vehicle. An autonomous vehicle may include one or multiple computing devices configured to receive and process information about the nearby environment received from sensors as the vehicle operates. Processing the information may enable the computing device to provide information and/or instructions to the systems of the vehicle to perform a safe navigation strategy as the vehicle travels through changing environments.

In one example embodiment, a vehicle may navigate while receiving lidar data indicative of the environment at one or multiple computing devices of the vehicle. For example, the vehicle may include a LIDAR module configured to capture sensor data, such as lidar data made up of data points associated with one or more objects in the environment. In some examples, the lidar data may be captured for the full 360-degree field-of-view around the vehicle.

Similarly, the vehicle may also include other types of sensors configured to provide sensor data that may be used for object detection, such as depth cameras. The computing device may receive the data points indicative of the environment in a structured three dimensional (3D) point cloud and/or unstructured 3D point cloud, for example. In some instances, the computing device may receive data points within a grid-like point cloud. The lidar data may include data points containing information indicative of the positions of objects in the environment relative to the vehicle. In other examples, the lidar data may include other information about the vehicle's environment. The lidar data may include a respective intensity for each respective point of the lidar data. The intensity may be based on a reflectivity of the surface that reflects the laser light. In some examples, when a surface is not normal (i.e., perpendicular to) the laser source, the intensity of the received laser signal may be lower than if the surface was normal to the laser source.

During operation, the computing device may use the lidar data points to generate a dimensional range image that includes pixels indicative of positions of objects and surfaces in the environment. As an example, the computing device may project the lidar data points onto a conceptual cylindrical surface positioned around the vehicle or virtually positioned around the vehicle in a virtual rendering so that the pixels correspond to data within the lidar data points. The resulting generated range image may include pixels that have values indicative of information in the environment and may also include some pixels that may not have a value from lidar data points. The missing values may correspond to portions of objects for which the computing device did not receive lidar data. In some example embodiments, the computing device may start generating portions of a range image prior to completing the reception of an entire point cloud. For example, the computing device may develop portions of the range image as the points are received from the LIDAR module.

Furthermore, the vehicle's computing device may modify the range image to fill in gaps that result from pixels without values. For example, the computing device may use respective neighboring pixels positioned proximal to the one or more gaps in the range image to determine an average value to assign to pixels in the gap that may originally not have a value. The computing device may use the modified range image to determine one or multiple normal vectors of sets of pixels that may correspond to respective surfaces of the one or more objects in the environment of the vehicle.

In some examples, the computing device may use the surface normals and plane segmentation processes to classify planes in the acquired sensor data (e.g., associate sets of pixels with surfaces in the environment), which may assist the vehicle in object recognition and obstacle avoidance. The computing device may develop a virtual mapping of objects within the environment as the vehicle navigates. Additionally, the computing device may use the normal vectors of sets of pixels as well as plane segmentation to provide object recognition information about the environment to systems of the vehicle, which the vehicle systems may use during operation to determine appropriate navigation strategies.

Additionally, the computing device may be able to calculate and apply intensity corrections for recieved laser signals. In some examples, the intensity corrections may be based on both a distance from an object causing laser light reflections as well as the angle of incidence. In some other examples, the correction may be based on only the angle of incidence.

Example systems within the scope of the present disclosure will now be described in greater detail. Generally, an example system may be implemented in or may take the form of an automobile. However, an example system may also be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Referring now to the Figures, FIG. 1 is a simplified block diagram of an example vehicle 100, in accordance with an example embodiment. Components coupled to or included in the vehicle 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the vehicle 100. The memory 114 may include instructions 115 executable by the processor 113, and may also store map data 116. Components of the vehicle 100 may be configured to work in an interconnected fashion with each other and/or with other components coupled to respective systems. For example, the power supply 110 may provide power to all the components of the vehicle 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the vehicle 100 may include more, fewer, or different systems, and each system may include more, fewer, or different components. Additionally, the systems and components shown may be combined or divided in any number of ways.

The propulsion system 102 may be configured to provide powered motion for the vehicle 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine, etc. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the vehicle 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of vehicle 100 could be configured in various formats, including a unicycle, bicycle/motorcycle, tricycle, or car/truck four-wheel format. Other wheel/tire formats are possible as well, such as those including six or more wheels. The wheels/tires 124 of vehicle 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the vehicle 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the vehicle 100 (e.g., an $O_2$ monitor, a fuel gauge, an engine oil temperature, etc.). Other sensors are possible as well.

The GPS module 126 may be any sensor configured to estimate a geographic location of the vehicle 100. To this end, the GPS module 126 may include a transceiver configured to estimate a position of the vehicle 100 with respect to the Earth, based on satellite-based positioning data. In an example, the computing device 111 may be configured to use the GPS module 126 in combination with the map data 116 to estimate a location of a lane boundary on road on which the vehicle 100 may be travelling on. The GPS module 126 may take other forms as well.

The IMU 128 may be any combination of sensors configured to sense position and orientation changes of the vehicle 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the vehicle 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, the LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (uv) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the vehicle 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a range image indicating a distance from the camera 134 to a number of points in the environment. To this end, the camera 134 may use one or more range detecting techniques. For example, the camera 134 may be configured to use a structured light technique in which the vehicle 100 illuminates an object in the environment with a predetermined light pattern, such as a grid or checkerboard pattern and uses the camera 134 to detect a reflection of the predetermined light pattern off the object. Based on distortions in the reflected light pattern, the vehicle 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the vehicle 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the vehicle 100.

The throttle 140 may be any combination of mechanisms configured to control the operating speed and acceleration of the engine/motor 118 and, in turn, the speed and acceleration of the vehicle 100.

The brake unit 142 may be any combination of mechanisms configured to decelerate the vehicle 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the vehicle 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the vehicle 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the vehicle 100. The navigation and pathing system 148 may additionally be configured to update the driving path dynamically while the vehicle 100 is in operation. In some examples, the navigation and pathing system 148 may be configured to incorporate data from the sensor fusion algorithm 144, the GPS module 126, and one or more predetermined maps so as to determine the driving path for the vehicle 100.

The obstacle avoidance system 150 may be any system configured to identify, evaluate, and avoid or otherwise negotiate obstacles in the environment in which the vehicle 100 is located.

The control system 106 may additionally or alternatively include components other than those shown.

Peripherals 108 may be configured to allow the vehicle 100 to interact with external sensors, other vehicles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other vehicles, sensors, or other entities, either directly or via a communication network. To this end, the wireless communication system 152 may include an antenna and a chipset for communicating with the other vehicles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the vehicle 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the vehicle 100. Similarly, the speakers 158 may be configured to output audio to the user of the vehicle 100.

The peripherals 108 may additionally or alternatively include components other than those shown.

The power supply 110 may be configured to provide power to some or all of the components of the vehicle 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the vehicle 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various vehicle functions, including any of the functions or methods described herein.

The components of the vehicle 100 could be configured to work in an interconnected fashion with other components within and/or outside their respective systems. To this end, the components and systems of the vehicle 100 may be communicatively linked together by a system bus, network, and/or other connection mechanism (not shown).

Further, while each of the components and systems is shown to be integrated in the vehicle 100, in some examples, one or more components or systems may be removably mounted on or otherwise connected (mechanically or electrically) to the vehicle 100 using wired or wireless connections.

The vehicle 100 may include one or more elements in addition to or instead of those shown. For example, the vehicle 100 may include one or more additional interfaces and/or power supplies. Other additional components are possible as well. In these examples, the memory 114 may further include instructions executable by the processor 113 to control and/or communicate with the additional components.

Figure 2:
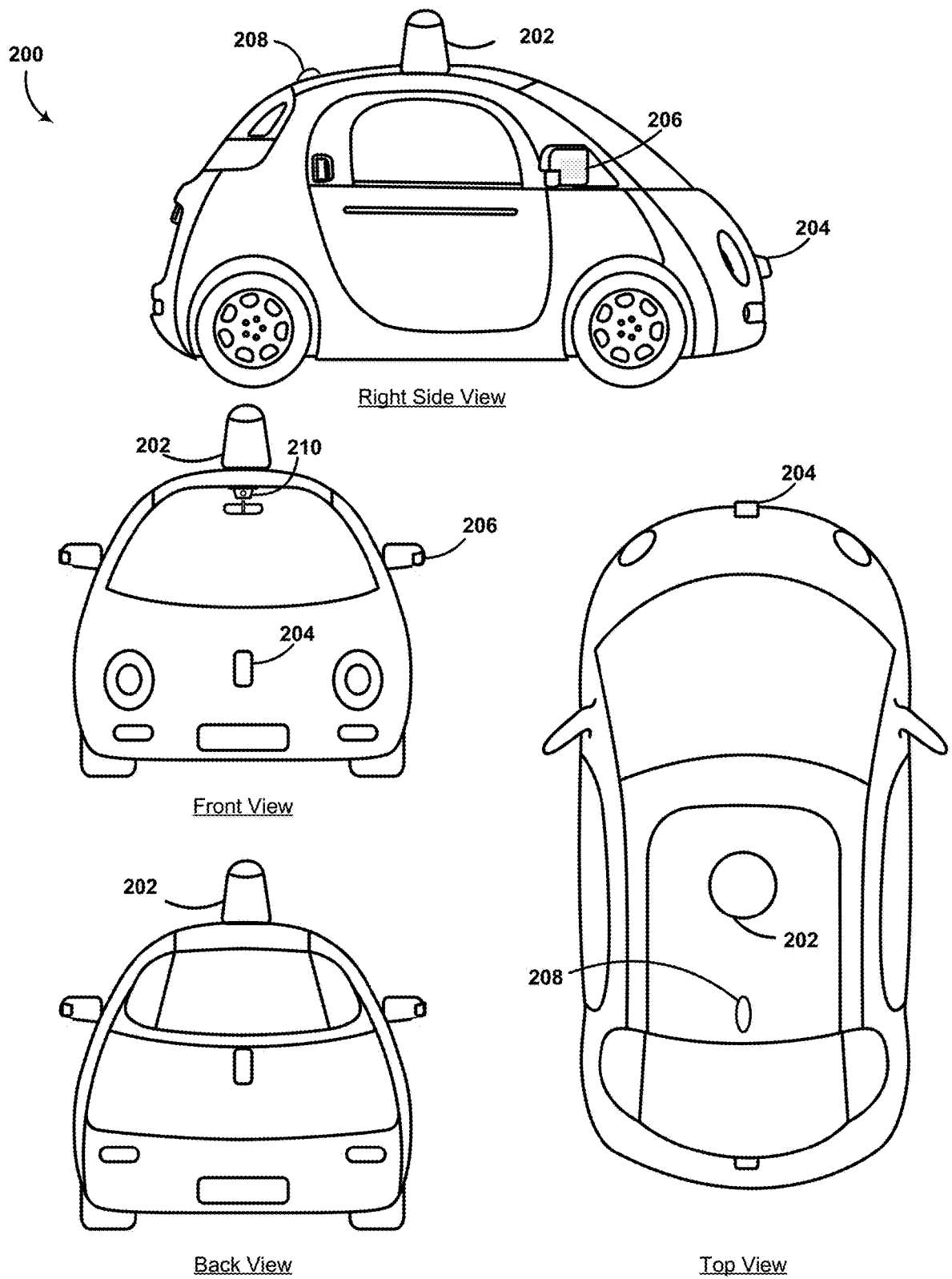
FIG. 2 illustrates an example vehicle, in accordance with an example embodiment.

FIG. 2 illustrates an example vehicle 200, in accordance with an embodiment. In particular, FIG. 2 shows a Right Side View, Front View, Back View, and Top View of the vehicle 200. Although vehicle 200 is illustrated in FIG. 2 as a car, other examples are possible. For instance, the vehicle 200 could represent a truck, a van, a semi-trailer truck, a motorcycle, a golf cart, an off-road vehicle, or a farm vehicle, among other examples. As shown, the vehicle 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202-206 are shown to be mounted in particular locations on the vehicle 200, in some examples the sensor unit 202 may be mounted elsewhere on the vehicle 200, either inside or outside the vehicle 200. Further, while only three sensor units are shown, in some examples more or fewer sensor units may be included in the vehicle 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the vehicle 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other vehicles, sensors, or other entities, either directly or via a communication network as described above with respect to the wireless communication system 152 in FIG. 1. While the wireless communication system 208 is shown to be positioned on a roof of the vehicle 200, in other examples the wireless communication system 208 could be located, fully or in part, elsewhere.

The camera 210 may be any camera (e.g., a still camera, a video camera, etc.) configured to capture images of the environment in which the vehicle 200 is located. To this end, the camera 210 may take any of the forms described above with respect to the camera 134 in FIG. 1. While the camera 210 is shown to be mounted inside a front windshield of the vehicle 200, in other examples the camera 210 may be mounted elsewhere on the vehicle 200, either inside or outside the vehicle 200.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
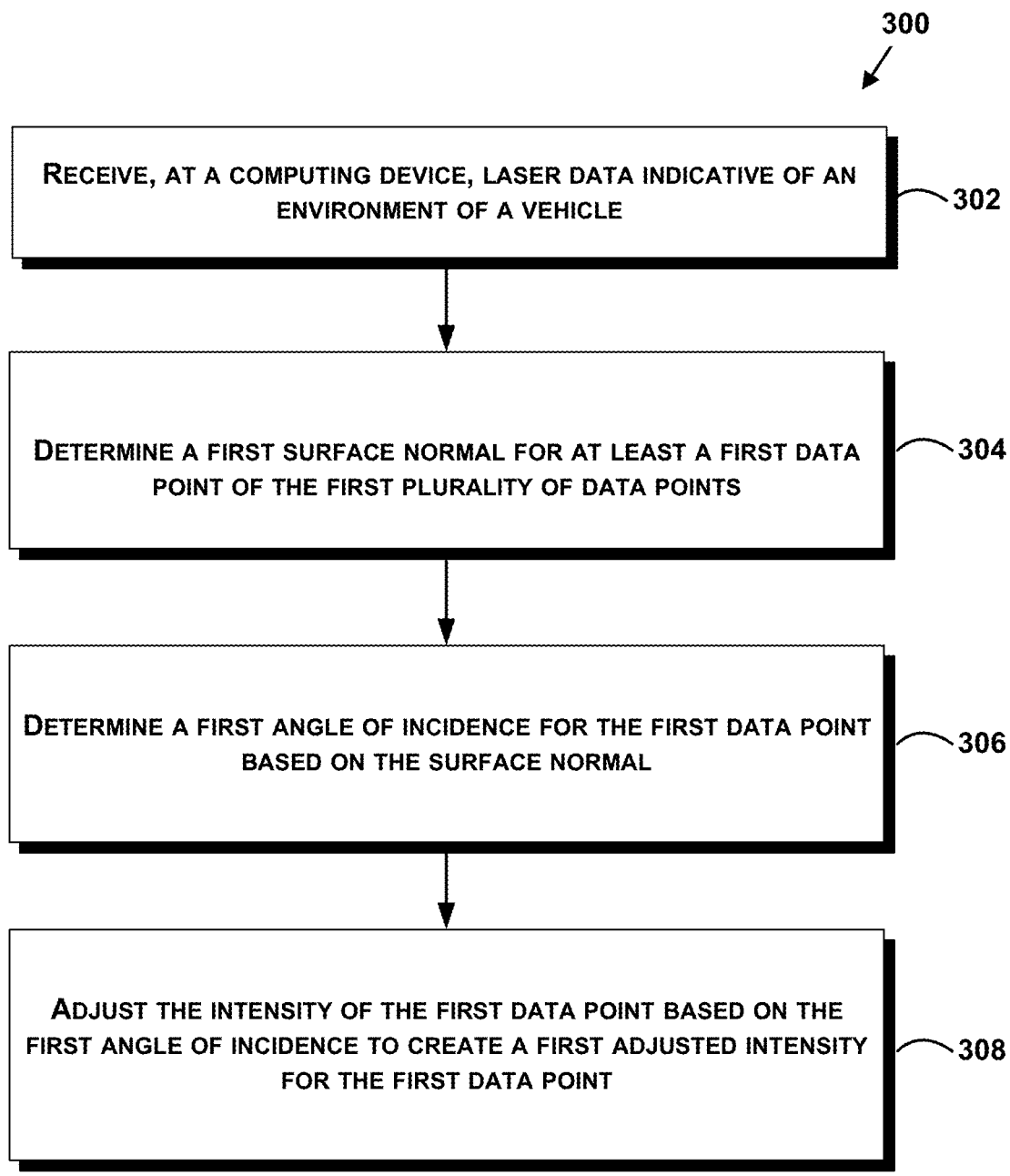
FIG. 3 is a flow chart of an example method for calculating reflectivity of an object.

FIG. 3 is a flow chart of an example method for calculating reflectivity of an object. The method 300 may include one or more operations, functions, or actions as illustrated by one or more blocks 302-308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation. Additionally, in some examples, method 300 may be performed in parallel with data from two different laser sensors (e.g., a first lidar data source and a second lidar data source).

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

The non-transitory computer readable medium could also be distributed among multiple data storage elements, which could be remotely located from each other. A computing device or system that executes some or all of the stored instructions could be a vehicle, such as the example vehicle 200 illustrated in FIG. 2. Alternatively, the computing device or system that executes some or all of the stored instructions could be another computing device or system, such as a server.

In addition, for the method 300 and other processes and methods disclosed herein, each block in FIG. 3 may represent circuitry that is wired to perform the specific logical functions in the process.

Example methods, such as method 300 of FIG. 3 may be carried out in whole or in part by the vehicle and its subsystems. Accordingly, example methods could be described by way of example herein as being implemented by the vehicle. The vehicle may be autonomous, partially autonomous, or controlled completely by a user, for example. However, it should be understood that an example method may be implemented in whole or in part by other computing devices of the vehicle or separate from the vehicle. For example, an example method may be implemented in whole or in part by a server system, which receives data from a device such as those associated with the vehicle. In some example implementations, the method may be executed by a robotic device or other types of computing devices as well. Other examples of computing devices or combinations of computing devices that can implement an example method are possible.

At block 302, the method 300 may include receiving, at a computing device, lidar data indicative of an environment of a vehicle. The lidar data includes a first plurality of data points indicative of locations of reflections from the environment and further includes a respective intensity for each data point. An example vehicle or robotic device may function using information provided by sensor(s) configured to capture measurements about the surrounding environment. In particular, a computing device of the operating vehicle or robotic device may receive sensor data from various sensors and process the data for use during operation, including for the determination and execution of control strategies.

As shown in FIGS. 1-2, an example vehicle may include a variety of sensors, including a LIDAR module configured to perform sweeps of the nearby environment to capture lidar data corresponding to objects near the vehicle. The LIDAR module may capture and provide information about the environment to the vehicle's computing device in the form of lidar data points, which may arrive at the computing device in the form of a point cloud. Depending on the type of LIDAR module, the computing device may receive any number of lidar data points configured in a structured or unstructured point cloud, for example. For example, the computing device may receive lidar data in a structure point cloud with each data point or sets of data points arranged based on objects in the local environment. An unstructured point cloud may include data points randomly received without any particular arrangement of the data points. The lidar data may be received from the full 360-degree field-of-view of the vehicle.

Furthermore, the lidar data points within the point cloud may have a structure that includes a grid-like format or may arrive at the computing device in points clouds that lack the grid-like format.

In other example embodiments, a vehicle's computing device may receive data from other sensors, such as images from RGB-depth cameras. The computing device may receive data from other sensors in addition to data points provided using LIDAR. The computing device may combine information received from multiple sensors, such as LIDAR and cameras.

At block 304, the method 300 may include, determining a first surface normal for at least a first data point of the first plurality of data points. The computing device may calculate the normal vectors of pixels that correspond to the same surface in the environment for object recognition purposes, which may assist the vehicle in autonomous navigation. The computing device may determine the surface normal based on the pixels adjacent (or otherwise nearby) to the pixel for which the normal is being determined.

In some examples, block 304 may be repeated for a plurality of the data points. In these examples, several data points may be associated with one surface. In some examples, the entire surface may have the same surface normal, such as a flat wall. In other examples, various portions of the surface may have difference surface normals, such as a curved surface.

In order to improve object recognition and ensure safe navigation, the computing device may determine normal vectors of surfaces as represented in the range image in real time as the range image is developed and processed. As such, the computing device may be configured to determine normal vectors within lidar data received in point clouds efficiently with relatively few CPU cycles, and may provide the determined normal with minimal latency to various systems of the vehicle.

In one example embodiment, the computing device may determine vector normal of sets of pixels by computing gradients across and down the image and smoothing the gradients using integral images. As a result, the computing device may compute normalized cross products of the gradients to produce the vector normal of various surfaces as indicated by sets of pixels. For example, the computing device may compute two vectors which are tangential to the local surface at the center of a set of pixels. The two vectors may be based on neighboring or nearby pixels. In some examples, the two vectors may be perpendicular to each other. From the two tangential vectors, the computing device may compute the vector normal using the cross product. For example, the computing device may compute a surface normal between either a left and a right neighboring pixel and between either an upper and lowering neighboring pixel, to have two perpendicular vectors.

In another example, the computing device may compute a surface normal based on making an assumption about the surface. For example, the computing device may be able to determine that the surface is generally perpendicular to the ground. Thus, the computing device may assume a vector that is perpendicular to the ground and calculate the second vector based on the neighboring point. In other examples, the computing device may make other assumptions about a surface so fewer than three points are needed to calculate the two vectors to determine the surface normal.

In some instances, the computing device may smooth the tangential vectors by computing the average vectors within a certain neighborhood of pixels. For example, the computing device may smooth gradients or tangential vectors within sets of pixels by using integral images, which may involve creating two maps of tangential vectors, one for the horizontal direction and one for the vertical direction. The computing device may then compute vectors for the maps between corresponding pixels in the range image or within corresponding points in the point cloud. The computing device may compute integral images to compute the average tangential vectors to calculate surface normals.

In some examples, the computing device may determine vector normal of different surfaces as represented by pixels in the range image prior to completing the reception of sensor data from the same point cloud. The computing device may be configured to immediately start processing sensor data as it is received from the sensors, for example. In other examples, the computing device may wait to receive an entire point cloud of an area of the environment from a sensor prior to processing the data to determine vector normal of surfaces.

In some yet further examples, the processing may be performed directly on point cloud data, rather than a range image. In examples using point cloud data, vectors may be created in a similar manner to determine the surface normal.

As an example implementation, a vehicle's computing device may use local geometric features such as surface normal or curvature within point form to determine information indicative of the environment of the vehicle. The computing device may determine a vector normal to a point (e.g., pixel) or a set of points (e.g., set of pixels) by fitting a plane to the point's local neighborhood, such as neighboring points. In some instances, the computing device may determine neighboring pixels of the range image (or point cloud) to use for calculating a surface normal of pixel by using a nearest neighbor process or selecting pixels within a radius distance from the pixel. When the computing device has focused upon a particular set of pixels to determine a surface normal from, the computing device may estimate the local surface normal by analyzing the eigenvectors of the covariance matrix of the set of pixels, for example.

The size of the set of pixels used to determine a surface normal may vary within examples. For example, the computing device may refrain from selecting a set of pixels that is too large, because the large number of pixels may cause the environmental structures to appear too smoothed out for an accurate surface normal determination. In the case that the computing device selects too few of pixels within a set to analyze for a surface normal, the estimated normals may be affected by noise in the received sensor data. The computing device may compensate negative effects by computing distances of pixels within the set of pixels to the local plane through the particular pixel focused upon for estimating a surface normal. The computing device may use the distances in an additional run to weight pixels in the set of pixels in the covariance computation. As a result, the computing device may better approximate the local surface structure and more accurately depict corners and edges of the surfaces.

In another example embodiment, the vehicle's computing device may use a fixed pixel neighborhood to extract surface normal information. For example, the computing device may use a fixed pixel neighborhood and may additionally subtract pre-computed neighbors outside of some maximum range of the surface. This way, the computing device may determine a surface normal of the pixels without a computationally expensive neighbor search.

In some example implementations, the computing device may compute surface normals in the local image coordinate frame or may transform both Cartesian coordinates based on the pixel information as well as the local surface normals into the base coordinate frame of the vehicle. The computing device may also use spherical coordinates of the local surface normals for processing the surface normals, for example. The computing device may further perform plane segmentation, which may involve clustering surfaces with similar surface normals to determine surfaces in the environment of the vehicle.

At block 306, the method 300 may include, determining a first angle of incidence for the first data point based on the surface normal. The systems of a vehicle may use the determined surface normal vector to calculate the angle of incidence between the direction of laser propagation and the surface normal. For example, if a surface is perpendicular to the angle and which the laser light reflects from the surface, the angle of incidence between the surface normal and the laser light is 0 degrees. The angle of incidence increases as the light impinges on the surface further away from the surface normal.

At block 308, the method 300 may include, adjusting the intensity of the first data point based on the first angle of incidence to create a first adjusted intensity for the first data point. Each respective data point may have an associated intensity (e.g., strength) of the received laser signal. The intensity may correspond to the amount of laser light that reflects back from the surface to the laser unit. When the surface is not normal (e.g., perpendicular to) the laser source, the intensity is reduced. Therefore, the received intensity may be adjusted to determine a true reflectivity of the object.

In intensity may be adjusted based on the cosine of the angle of incidence. Based on Lambert's law, a diffuse radiator (i.e., an object reflecting laser light) reflects light with an intensity that is proportional to the cosine of the angle of incidence. Thus, for surfaces that are Lambertian (i.e., those that reflect light according to Lambert's law), the cosine of the angle of incidence may be used to adjust the intensity of the received laser reflections. To adjust the intensity, the measured (or sensed) intensity may be divided by the cosine of the angle of incidence. Because the value of cosine ranges from zero to one (as the angle change from ±90 degrees to 0 degrees), dividing the intensity by cosine will always either increase the value of the intensity or keep it the same. Therefore, by dividing by cosine, the adjusted intensity of a given point will be increased compared to the measured intensity when the angle of incidence is not 0 degrees and the adjusted intensity will be the same as the measured intensity when the angle of incidence is 0 degrees.

In some examples, the system may also apply an correction based on a distance from the object causing reflections. Because the intensity of light drops proportionally to the square of distance, further objects will produce relatively less intense reflections. In these examples, reflections may be received having a "raw" intensity. The "raw" intensity may be adjusted based on a distance to the reflecting object to produce a "range-adjusted" intensity. Some or all of steps 304-308 may be performed on the "range-adjusted" intensity to determine the adjusted intensity. In these examples, two adjustments may be applied, one for range and one for the angle of incidence. In some other examples, the distance adjustment may be performed after blocks 304-308, therefore the angle-adjusted intensity may be further adjusted based on the range.

Steps 304-308, may be repeated for a plurality of data points within a set of received laser points. In some examples, a set of points may be determined to have the same surface normal. In these examples, all points associated with the surface may have their intensity adjusted at the same time, as the surface normal is the same. In some other examples, steps 304-308 may be repeated based on the system determining a likelihood that the points are associated with the same object. In yet other examples, steps 304-308 may be repeated for a majority of the points of the set of data. Additionally in some examples, the data points that have the same surface normal may be grouped based on the surface being associated with a single object. In some further examples, the method may also determine a reflectivity of the surface of the object that comprises the data points that have the same surface normal.

The method may include various other steps after step 308. The method may also include performing object recognition based on the adjusted intensities. The method may also include adjusting autonomous driving instructions based on the adjusted intensities. In some examples, an object may not have been detected, or detected incorrectly based on the measured intensities. After the intensities are adjusted, the object may be correctly detected. Therefore, it may be desirable to adjust driving instructions based on the identification of objects in the corrected data.

In some further examples, after step 308, the method may include determining a sensor calibration or a sensor error. The sensor calibration error may be detected based on a difference in adjusted intensities between two different laser sensors. For example, two laser sensors may be able to illuminate the same object with laser light. If there is a difference in the adjusted insities between the two laser sensors, there may be a calibration error, manufacturing error, or other sensor error. In another example, the method may include determining that there is an obstruction in front of the laser unit. For example, if there is an obstruction on a lens or housing of the laser unit, the intensity of laser reflection when the laser light passes through the obstruction may cause decreased intensities. By comparing adjusted intensities for various angles of laser transmission, obstructions of the lens may be detected.

In some further examples, the method may include using adjusted intensities to create more accurate maps. The data used to create the map may be based on the adjusted intensity in order to make the data not dependent on laser angle of incidence. In this situation, the map data may be created as if the laser light was normal to each surface.

In some additional examples, the method may also include a computing device of a vehicle may provide object recognition information to the vehicle's control system. The control system may adjust steering, throttle, brakes, navigation/pathing system, or an obstacle avoidance system based on the received information. For example, the control system may adjust the path of the vehicle based on the information provided by the computing device.

Many other examples of how the computing device may use the adjusted intensities as part of the method are possible as well. In another example implementation, a computing device of a robotic device may use the object recognition information to recognize particular objects within a room or for obstacle avoidance. For example, the computing device may use the vector normals as well as segmentation using the surface normals to identify objects in the environment and avoid collisions. It may be advantageous for the object recognition system to use adjusted lidar data when detecting objects. By using the adjusted data, the effects of lower laser intensities due to the incidence angle may be mitigated. For example, various machine learning algorithms may function more accurately when processing the adjusted data.

In yet another example embodiment, the vehicle's computing device may use computed surface normals as well as plane segments and spherical coordinates for detecting obstacles in the environment. The computing device may compensate for noise in lidar data and errors by projecting points onto the determined planes the points belong to. Further, the computing device may correct local surfaces at detected planes using other processes. The computing device may segment and classify planes in the acquired lidar data.

In a further example embodiment, the computing device of a vehicle may receive sensor data and project the point cloud (structured or unstructured) to create a range image. The computing device may project the points of the point cloud prior to receiving the complete point cloud. As a result, the computing device may construct an ordered point image from the range image. The computing device may then compute gradients across and down the point image and may further compute integral images of the gradient. Additionally, the computing device may reconstruct smoothed gradients from the integral images and may also reconstruct smoothed gradients from the integral images. In some instances, the computing device may compute the cross product of the smoothed gradients and may normalize and flip the cross products to produce surface normals.

Figure 4:
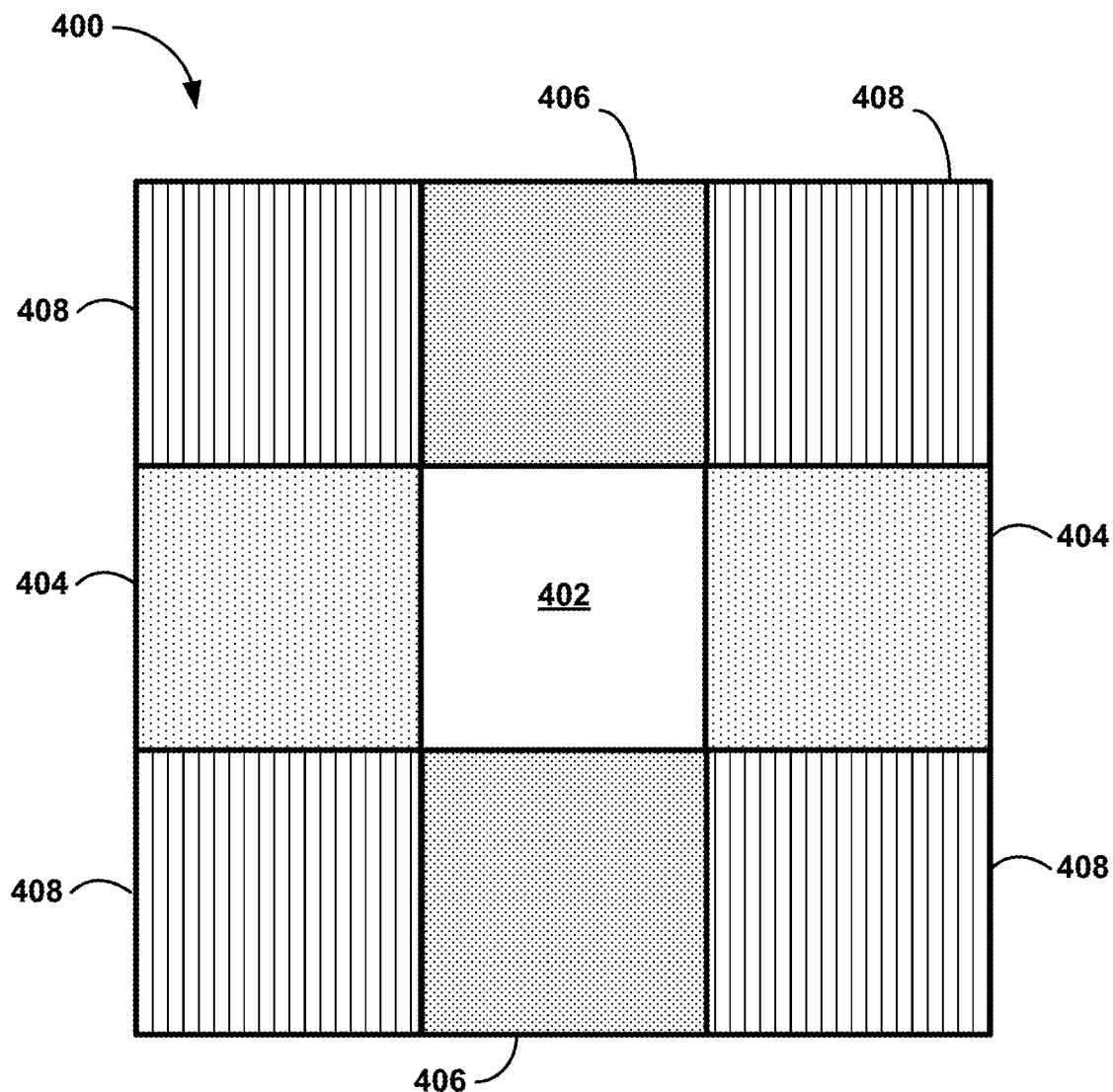
FIG. 4 is an example diagram illustrating pixels in a portion of a range image.

FIG. 4 is an example diagram illustrating pixels in a portion of a range image. The portion of the range image 400 shows nine pixels 402-408 arranged in a square, but may include more or less pixels within other examples. A vehicle's computing device may develop and use the range image including pixels 402-408 to extract object recognition information of the surrounding environment of the vehicle during navigation, which may include determining vector normal of specific surfaces in the environment based on sets of pixels.

In the example diagram, the center pixel 402 may represent an empty pixel that is indicative of a possible gap within the range image determined by the vehicle's computing device using received lidar data indicative of the environment. As previously described, a vehicle's computing device may use lidar data to project and determine a range image that is made up of pixels based on the data indicative of the environment as captured by a sensor, such as lidar data received in a point cloud format. The range image developed by the computing device may include one or multiple gaps, which may encompass pixels that may not correspond to data points received in the point cloud and thus, may not have a value.

In some example embodiments, to fill in the gaps in the range image, such as center pixel 402 shown in FIG. 4, the computing device may use the values of neighboring pixels positioned proximal to the center pixel 402 to determine a value to give to the center pixel 402. By that operation, the computing device may fill in gaps within the range image and thus, generate a more complete range image to use for determining normal vectors of sets of pixels that may correspond to a surface in the environment of the vehicle.

As one example, the vehicle's computing device may use the neighboring pixels 404 positioned to the left and right sides of the center pixel 402 to determine a value for the center pixel 402. For example, the computing device may calculate an average value of the neighboring pixels 404 positioned to the left and the right of the center pixel 402 to assign the average value to the center pixel 402. In some instances, the computing device may use additional pixels on the sides of the center pixel 402 as well to calculate an average for the center pixel 402.

Similarly, in another example, the computing device may use the neighboring pixels 406 positioned above and below the center pixel 402 to determine a possible value to assign to the center pixel 402 in order to fill in the gap within the image. The computing device may use more or less pixels as well to determine a value for empty pixels, such as center pixel 402.

In another example embodiment, the computing device may use all the corners pixels to determine the value, such as pixels 408. Likewise, the computing device may use all the pixels 404-408 proximal to the center pixel 402 to calculate an average value to assign to the center pixel 402. In other examples, the computing device may use other combinations of pixels to determine a value for the center pixel 402, which may involve more or less pixels.

FIGS. 5A-5D show different views of a conceptual illustration of an example vehicle navigating using generated point clouds. As previously indicated, a vehicle may navigate using sensors, such as LIDAR, to extract measurements about the surrounding environment of the vehicle. A computing device of the vehicle may process the incoming information to avoid obstacles and ensure safe navigation, as shown in FIGS. 5A-5D. In some examples, a vehicle's computing device may develop portions of a range image as data points are received from sensors. Similarly, the computing device may project the data points to develop an entire 360 degree panorama of a virtual image that corresponds to the vehicle's environment, such as the portions of the 360 degree panorama illustrated in FIGS. 5A-5D.

Figure 5A:
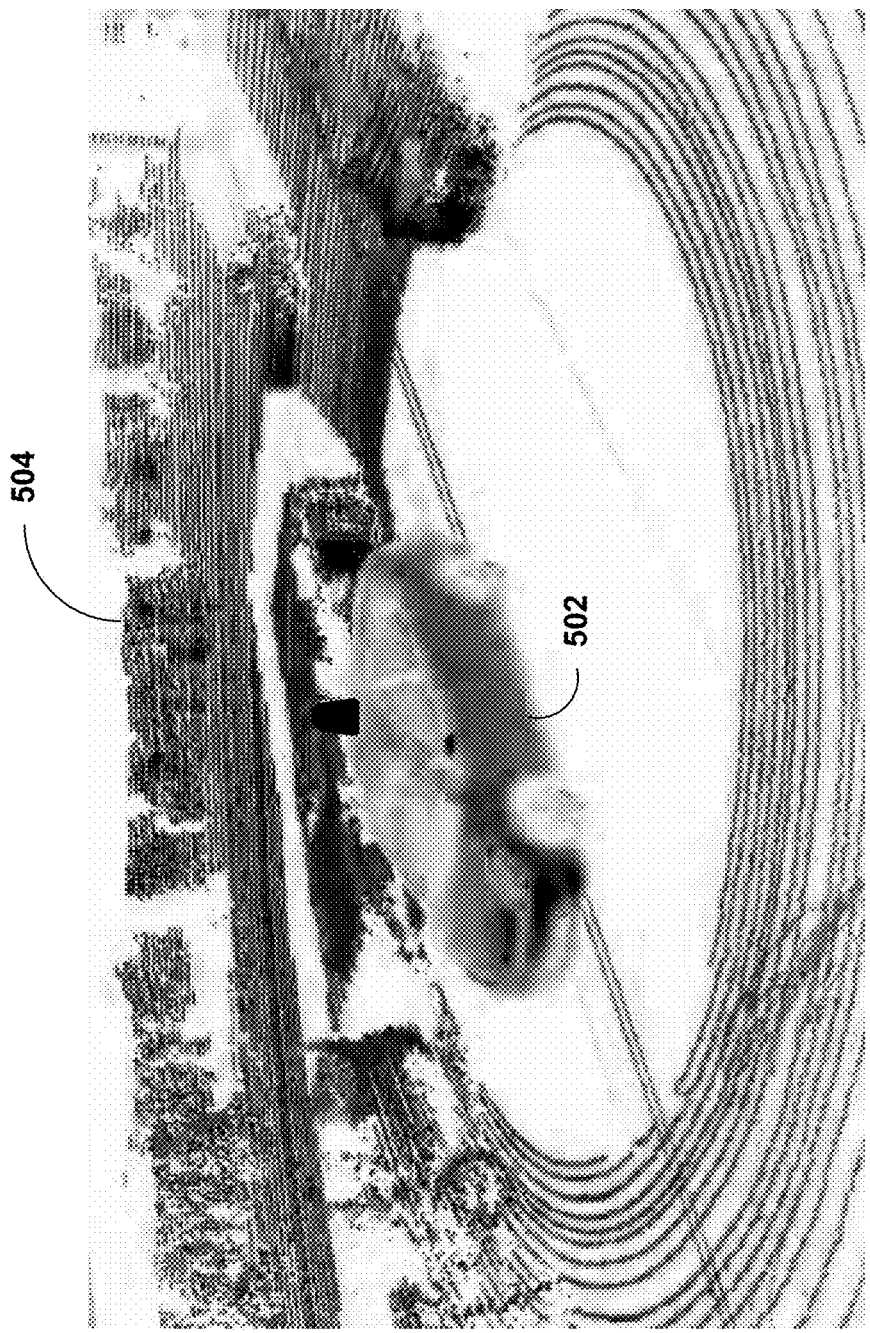
FIG. 5A shows the example vehicle from a front-side view and illustrates portions of a virtual range image generated by a computing device of the example vehicle using sensor data.

FIG. 5A shows the example vehicle from a front-side view and illustrates portions of a virtual range image generated by a computing device of the example vehicle using sensor data. As the example vehicle 502 navigates, sensors of the vehicle 502 may capture and provide data indicative of the environment to the vehicle's computing device. As previously discussed, upon receiving data from a sensor, such as lidar data using LIDAR, the computing device may project the data to determine a conceptual range image 504 that includes pixels based on the data that correspond to objects and other surfaces in the local environment. The computing device may start developing portions of the range image 504 upon receiving a portion of a point cloud, for example. Additionally, the computing device may determine surface normals and adjust the intensities of respective points based on the determined surface normals in real time or after a predetermined amount of data is captured.

In other examples, the computing device may wait for the entire point cloud received using LIDAR prior to determining the range image 504 and calculating the associated adjusted intensities. As the vehicle continues to navigate, the computing device may continue to receive new data from sensors, such as new point clouds of data, which the computing device may use to update its range image 504 or generate new images that correspond to the changing environment for processing and object detection. Furthermore, the computing device may use the range image 504 or portions of the range image to calculate surface normal of sets of pixels that correspond to the same surfaces in the environment, which the computing device may use along with segmentation to recreate a virtual range of the environment that may be used for obstacle avoidance and navigation. The range image may include pixels that reflect the environment of the vehicle in a virtual range format, for example.

Figure 5B:
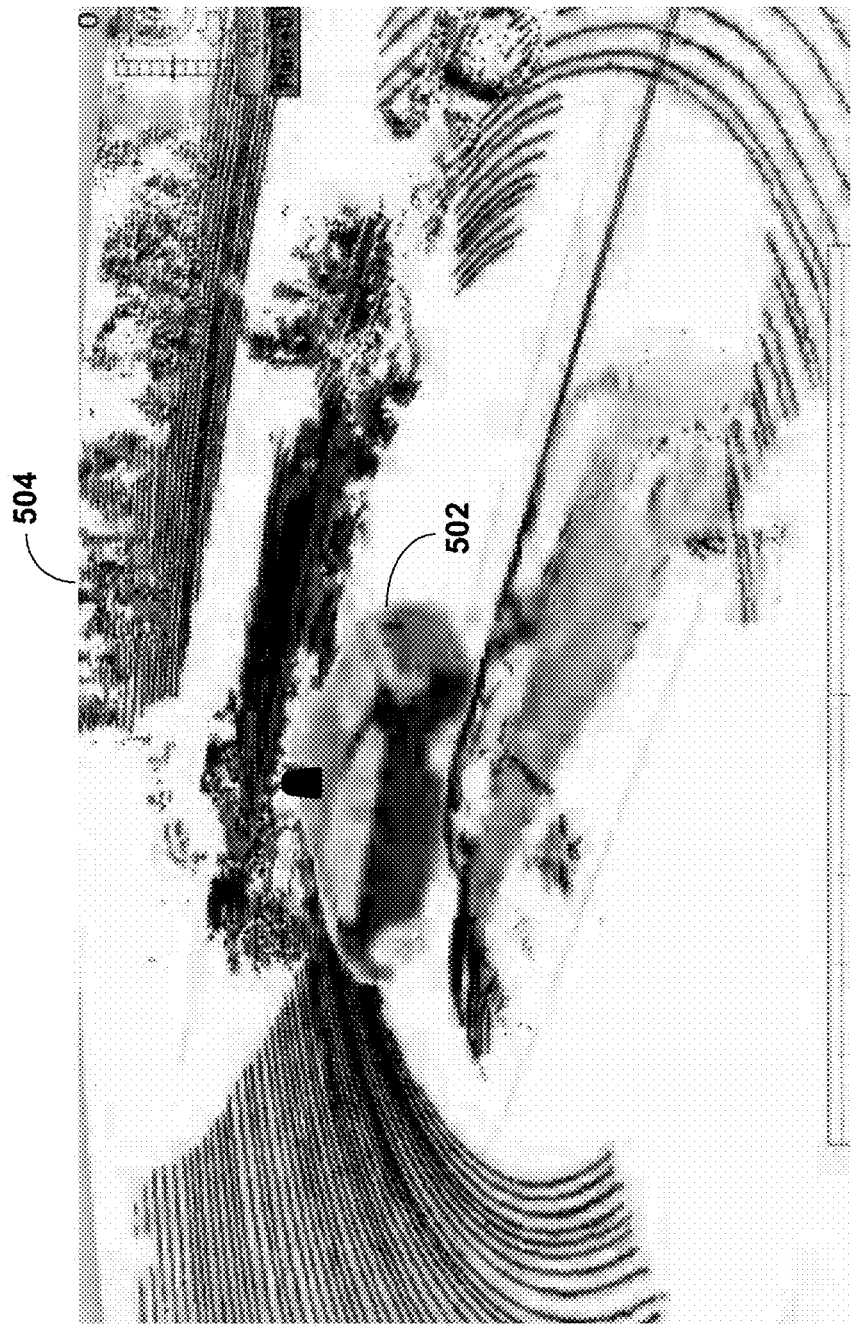
FIG. 5B shows the example vehicle from a side view and illustrates additional portions of the range image generated by the computing device of the example vehicle using sensor data.

FIG. 5B shows the example vehicle from a side view and illustrates additional portions of the range image generated by the computing device of the example vehicle using sensor data. The computing device of the vehicle 502 may continuously update its range image 504 or develop new range images based on incoming sensor as the vehicle navigates a path of travel. The example illustration shown in FIG. 5B may represent another view of the example illustration shown in FIG. 5A or may illustrate the example vehicle at a different time period, such as before or after the time period shown in FIG. 5A.

Figure 5C:
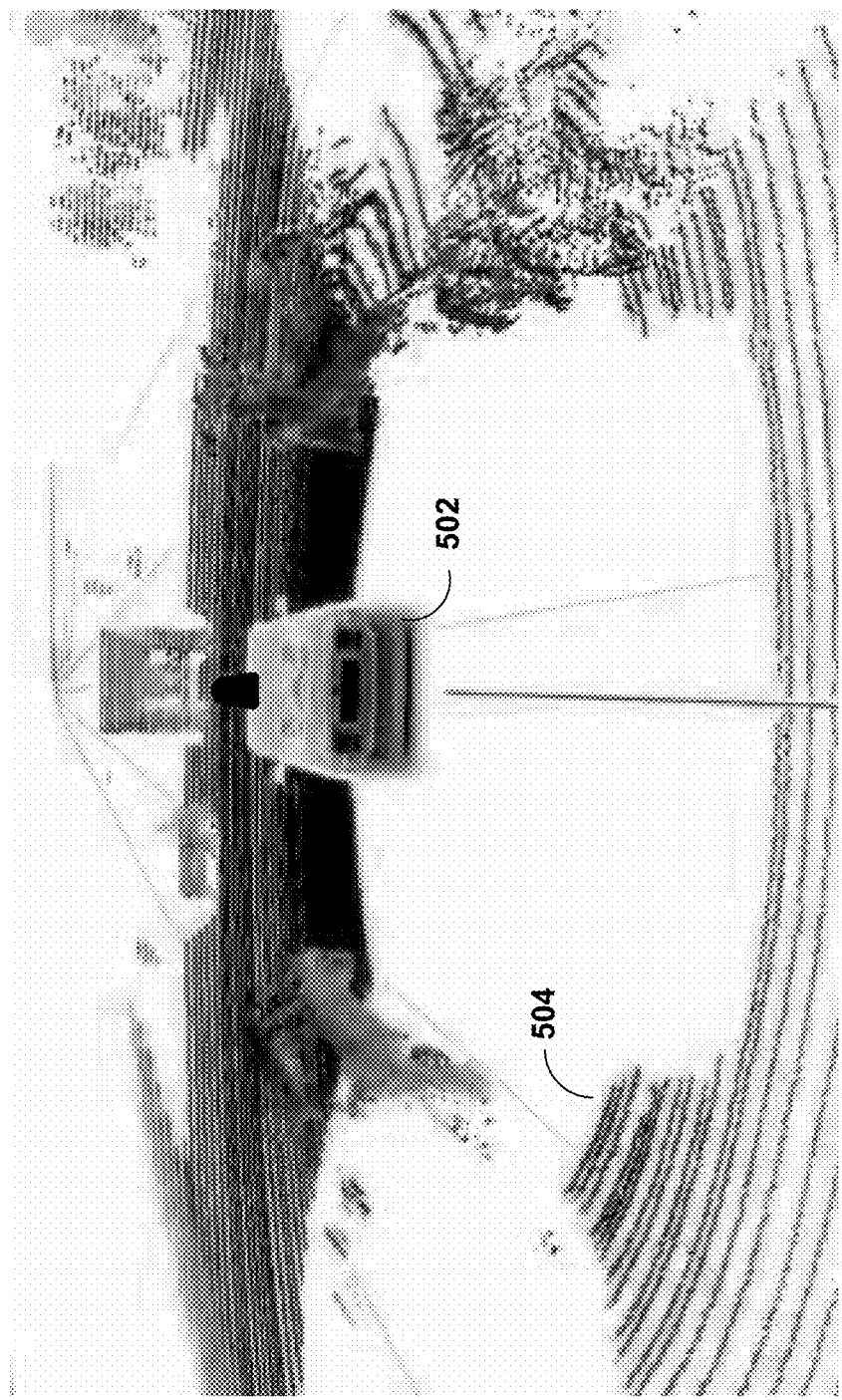
FIG. 5C shows the example vehicle from a back view and illustrates portions of the range image generated by the computing device of the example vehicle using sensor data.

FIG. 5C shows the example vehicle from a back view and illustrates portions of the range image generated by the computing device of the example vehicle using sensor data. Similar to FIGS. 5A-5B, the example illustration in FIG. 5C shows a portion of the range image 504 that the example vehicle 502 may use for calculating vector normals of one or multiple surfaces in the surrounding environment as well as for object recognition purposes.

Figure 5D:
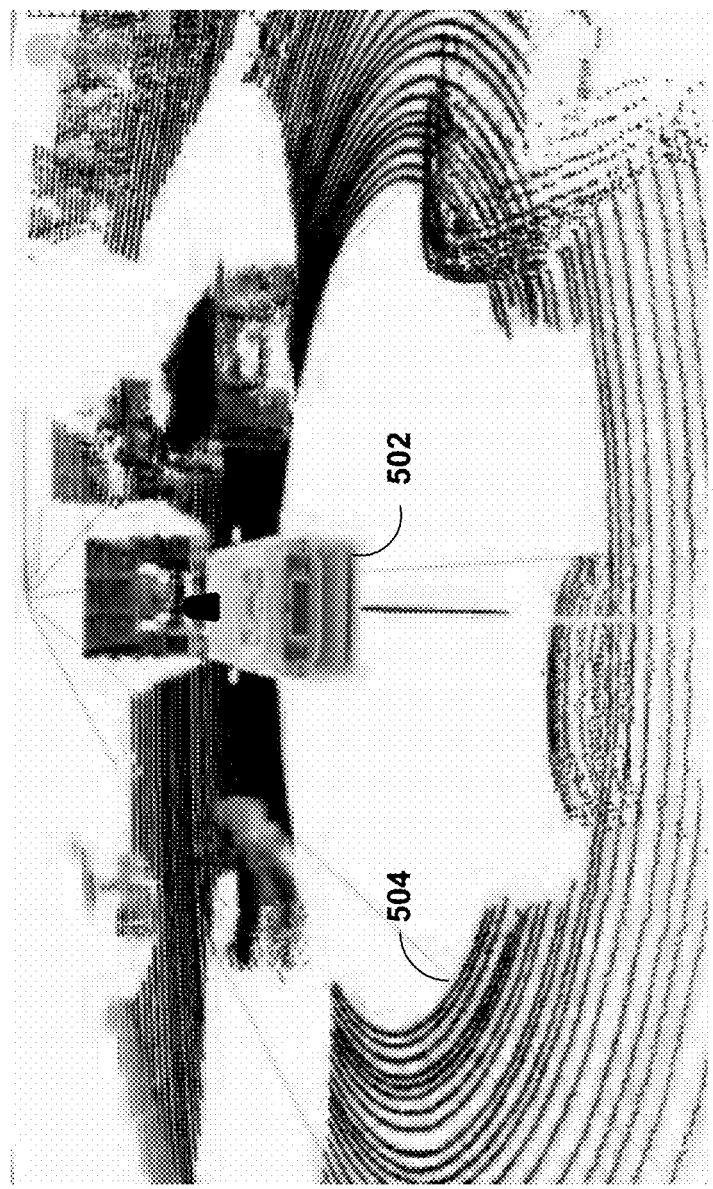
FIG. 5D shows the example vehicle from another back view and illustrates portions of the range image generated by the computing device of the example vehicle using sensor data.

FIG. 5D shows the example vehicle from another back view and illustrates portions of the range image generated by the computing device of the example vehicle using sensor data. Similar to the illustration shown in FIG. 5C, FIG. 5D shows the example vehicle 502 from a view from behind the vehicle 502 and also includes portions of the conceptual range image 504 positioned around the vehicle. The example illustration shows changes in segments of the range image 504 relative to the portions of the range image shown in FIG. 5C.

Figure 6A:
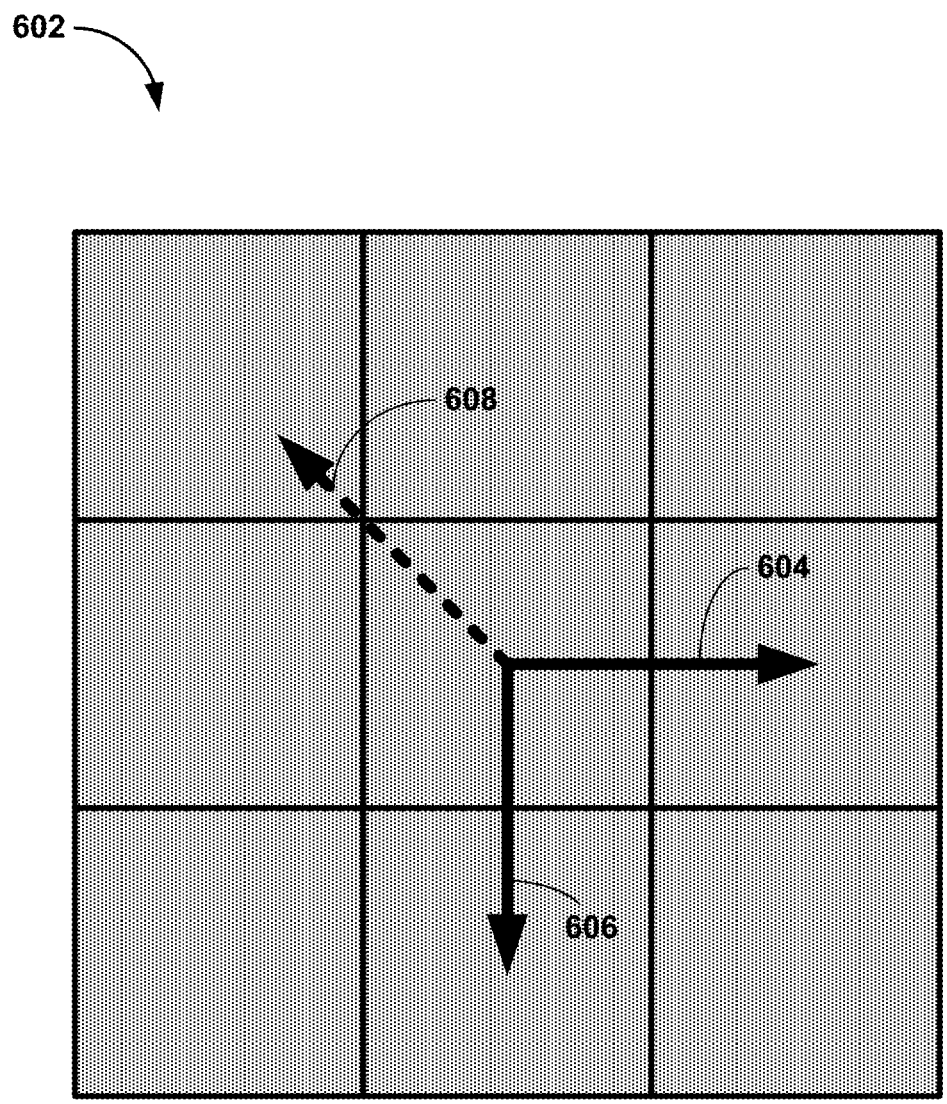
FIG. 6A is an example diagram illustrating a vector normal computation of a set of pixels.

FIG. 6A is an example diagram illustrating a vector normal computation of a set of pixels. The example diagram shows a set of pixels 602 that is made up of nine pixels that may represent a portion of a range image determined from lidar data by a computing device of a vehicle. Although the example diagram shows the set of pixels 602 including nine pixels, other examples may include more or less pixels. In the example diagram, the set of pixels 602 may represent a surface in the local environment of the vehicle. For example, the set of pixels 602 may represent a surface of an object, such as a vehicle, sign, boundary, or other type of surface. The computing device may determine the set of pixels 602 using various processes, such as selecting the neighborhood of pixels based on a predefined number that the computing device is configured to use. The computing device may use other methods or processes for determining which pixels and how many pixels to use for a set of pixels to extract a surface normal as well.

A computing device of the vehicle may process the set of pixels 602 by determining tangential vectors 604-606 in order to calculate the surface normal 608 associated with the set. As shown in the example diagram, the computing device may determine a horizontal vector 604 and a vertical vector 606 that connect to form a right angle. The computing device may determine other vectors for calculating the surface normal in other examples.

Upon determining the tangential vectors 604-606, the vehicle's computing device may calculate the surface normal vector 608, which may be calculated using the cross product of the tangential vectors 604-606. Other examples of determining the surface normal of the set of pixels 602 may exist as well. As such, the computing device may use the set of pixels 602 and vector normal 608 for objection detection. The computing device may provide the vector normal 608 associated with the set of pixels 602 as well as surface normals of other sets of pixels and/or other data to systems of the vehicle to use during navigation. Further, the computing device may also use segmentation to combine sets of pixels to map the environment based on surface normals and other information within the sensor data received.

Figure 6B:
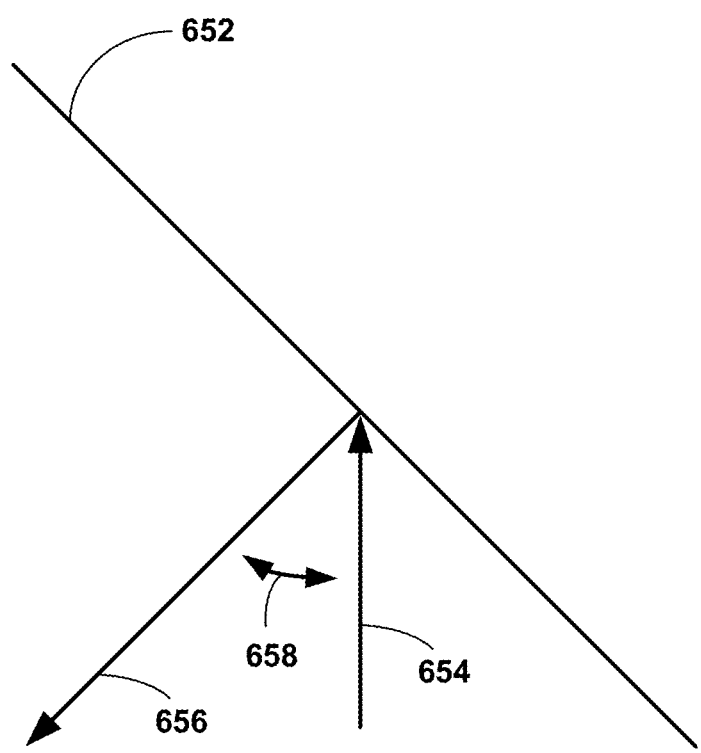
FIG. 6B is an example diagram illustrating a vector normal and an angle of incidence for a surface.

FIG. 6B is an example diagram illustrating a surface 652, exposing to incoming laser light 654, having a vector normal 656 and an angle of incidence 658. Although the surface 652 is shown as a flat surface, it may also be curved surface, or any other shaped surface. When an incoming laser light 654 strikes the surface 652, the surface 652 may reflect and scatter the incoming laser light 654 in various directions. A portion of the incoming laser light 654 may be reflected back in the same direction to the laser sensor that transmitted the incoming laser light 654. The surface normal 656 is perpendicular to the plane of the surface 652. The angle of incidence 658 is the angle between the angle of the incoming laser light 654 and the surface normal 656.

In examples, where the surface 652 is not flat, the surface normal is perpendicular to the plane of the surface 652 at the point where incoming laser light 654 hits the surface. Because a non-flat surface will have many different surface normals, a new surface normal may be calculated for each point where incoming laser light strikes the surface and reflects back to the laser sensor.

Figure 7:
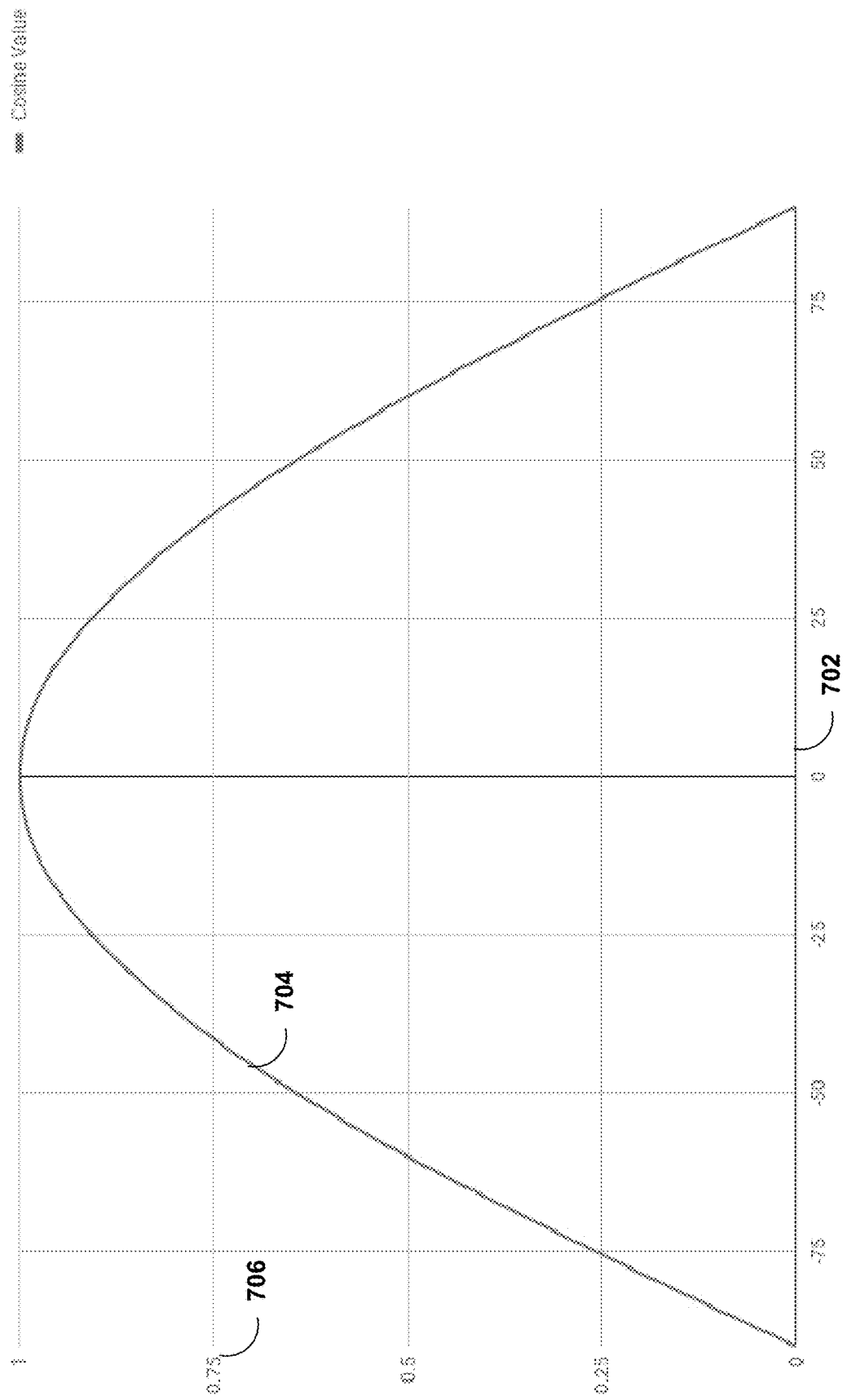
FIG. 7 is an example diagram illustrating values of cosine for various angles.

FIG. 7 is an example diagram illustrating values of cosine for various angles. For various angles 702 from −90 degrees to 90 degrees, curve 704 shows the value of cosine 706. The various angles 702 may correspond to the angle of incidence for laser striking a surface. To calculate the adjusted intensity, the measured intensity may be divided by the cosine of the angle of incidence. As shown in FIG. 7, the cosine for a 0 degree angle of incidence is 1. As another example, the cosine for a 60 degree angle is 0.5. As yet another example, the cosine for a 45 degree angle is 0.7071. The cosine for the angle may be determined after an angle of incidence is determined.

Figure 8A:
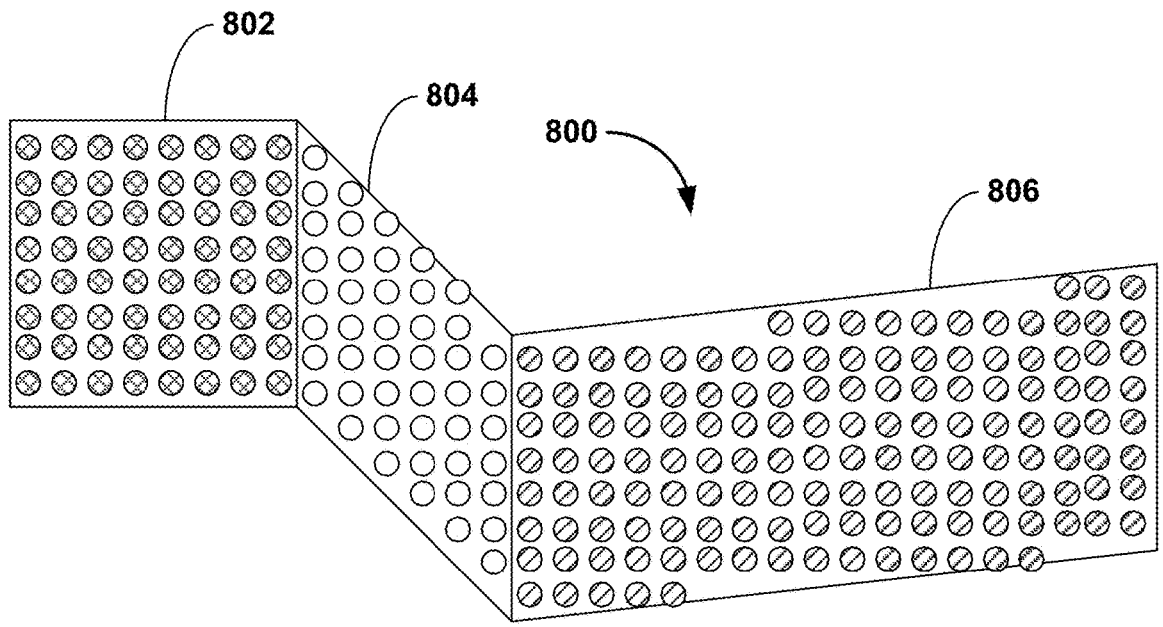
FIG. 8A is an example diagram illustrating pixels of three surfaces with unadjusted intensities.

FIG. 8A is an example diagram 800 illustrating pixels of three surfaces (802, 804, 806) with unadjusted laser intensities. Each respective surface of the three surfaces (802, 804, 806) has a different angle with respect to the source of the laser light. Because of the different angles, the respective laser reflections from each surface may have an intensity that is a function of both (i) the reflectivity of the surface and (ii) the angle of incidence of the laser. As shown in FIG. 8A, each surface has a plurality of points on the surface that correspond to laser reflections. In this example, each surface may be made of the same material, and therefore has approximately the same reflectivity overall.

Surface 802 may be approximately normal to the laser source. Therefore the angle of incidence is approximately zero. Surface 804 has a relatively large angle of incidence, approximately 60 degrees. Surface 806 has a relatively low angle of incidence, approximately 25 degrees. The laser points on surface 802 may have the highest unadjusted intensity, because the angle of incidence for the laser is approximately zero. Conversely, the laser points on surface 804 may have the lowest unadjusted intensity, because the angle of incidence for the laser is the highest of any of the surfaces. The laser points on surface 806 may have an unadjusted intensity that is slightly less than that of surface 802.

Figure 8B:
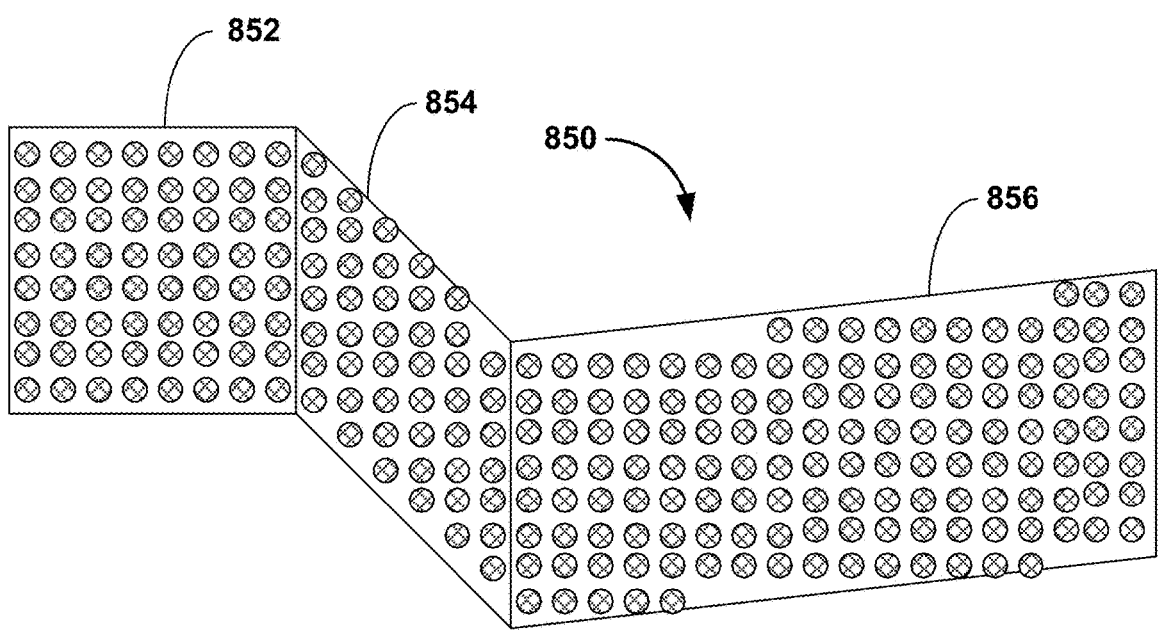
FIG. 8B is an example diagram illustrating pixels of three surfaces with adjusted intensities.

FIG. 8B is an example diagram 850 illustrating pixels of three surfaces (852, 854, 856) with adjusted laser intensities. As previously discussed, in order to adjust the pixels, each pixel may be divided by the cosine of the angle of incidence for the laser at the respective pixel. Here, because surface 802 may be approximately normal to the laser source (i.e., an angle of incidence is approximately zero), the intensity of pixels corresponding to surface 802 may be divided by the Cosine of zero, which equals one. Thus, for pixels that correspond to surfaces that are normal to the laser source, the adjusted value is equal to the unadjusted value.

However, surface 804 and surface 806 have angles of incidence of 60 and 20 degrees respectively. The cosine of 60 degrees is 0.5 and the cosine of 25 degrees is 0.91. Thus, to obtain the adjusted values, each pixel intensity of surface 804 is divided by 0.5 and each pixel intensity of surface 806 is divided by 0.91.

Because each of the three surfaces in the present example are made of the same material the adjusted intensities shown in FIG. 8B are approximately the same intensity when adjusted for angle of incidence. However, in other examples, where the surfaces are different, the adjusted intensities may not be equal after adjusting The pixels of FIGS. 8A and/or 8B may be stored in a memory of the vehicle as previously discussed as a set of lidar data. The adjustments described herein may be made directly on the stored data. Additionally, as previously described, object detection system may used the adjusted data to determine objects that are imaged by the lidar data.

Figure 9:
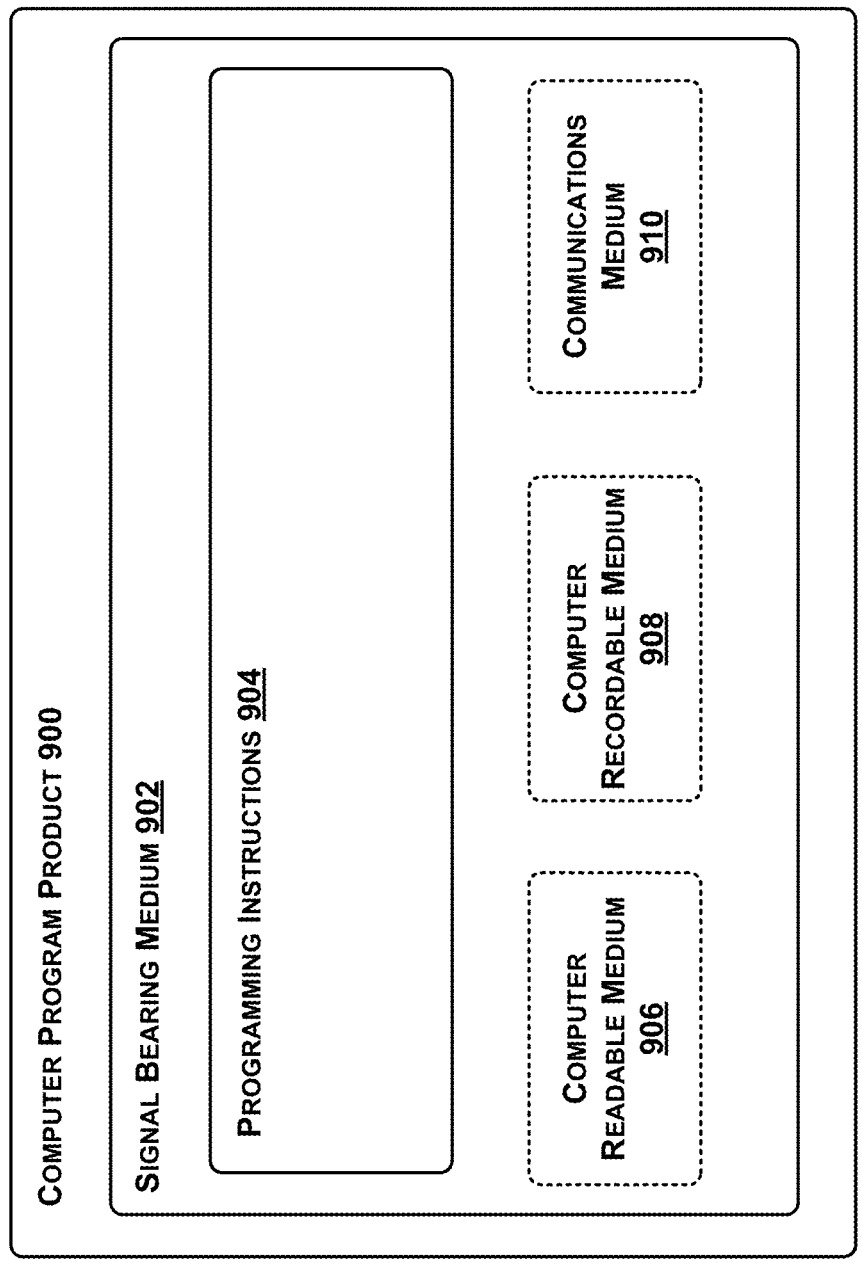
FIG. 9 is a schematic illustrating a conceptual partial view of an example computer program product that includes a computer program for executing a computer process on a computing device.

FIG. 9 is a schematic illustrating a conceptual partial view of an example computer program product that includes a computer program for executing a computer process on a computing device, arranged according to at least some embodiments presented herein.

In one embodiment, the example computer program product 900 is provided using a signal bearing medium 902. The signal bearing medium 902 may include one or more programming instructions 904 that, when executed by one or more processors may provide functionality or portions of the functionality described above with respect to FIGS. 1-7. In some examples, the signal bearing medium 902 may encompass a computer-readable medium 906, such as, but not limited to, a hard disk drive, a Compact Disc (CD), a Digital Video Disk (DVD), a digital tape, memory, etc. In some implementations, the signal bearing medium 902 may encompass a computer recordable medium 908, such as, but not limited to, memory, read/write (R/W) CDs, R/W DVDs, etc. In some implementations, the signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, the signal bearing medium 902 may be conveyed by a wireless form of the communications medium 910.

The one or more programming instructions 904 may be, for example, computer executable and/or logic implemented instructions. In some examples, a computing device such as the processor 112 of FIG. 1 may be configured to provide various operations, functions, or actions in response to the programming instructions 904 conveyed to the processor by one or more of the computer readable medium 906, the computer recordable medium 908, and/or the communications medium 910.

The non-transitory computer readable medium could also be distributed among multiple data storage elements, which could be remotely located from each other. The computing device that executes some or all of the stored instructions could be a device, such as the device 100 illustrated in FIG. 1. Alternatively, the computing device that executes some or all of the stored instructions could be another computing device, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

What is claimed is:

1. A method comprising:
receiving, at a computing device, lidar data indicative of an environment of a vehicle from a first lidar data source, wherein the lidar data includes a first plurality of data points indicative of locations of reflections from the environment and further includes a respective intensity for each data point;
determining respective surface normals for the first plurality of data points, wherein determining the respective surface normals for the first plurality of data points comprises determining a first surface normal for a first data point of the first plurality of data points, wherein determining the first surface normal comprises:
determining a first vector between the first data point and a first neighboring data point of the first plurality of data points;
determining a second vector between the first data point and a second neighboring data point of the first plurality of data points;
determining a cross product of the first vector and the second vector; and
determining the first surface normal based on the cross product;
determining a first angle of incidence for the first data point based on the first surface normal;
adjusting the intensity of the first data point based on the first angle of incidence to create a first adjusted intensity for the first data point;
associating a group of data points in the first plurality of data points with an object based on a similarity of the respective surface normals of the data points in the group;
identifying the object based on the first adjusted intensity for the first data point; and
controlling the vehicle based on the identified object.

2. The method of claim 1, wherein receiving, at the computing device, lidar data indicative of the environment of the vehicle comprises receiving the first plurality of data points associated with one or more objects in the environment in a structured point cloud.

3. The method of claim 1, wherein receiving, at the computing device, lidar data indicative of the environment of the vehicle comprises receiving the first plurality of data points associated with one or more objects in the environment in an unstructured point cloud.

4. The method of claim 1, wherein receiving, at the computing device, lidar data indicative of the environment of the vehicle comprises receiving the first plurality of data points associated with one or more objects in the environment in a point cloud format other than a grid-like point cloud.

5. The method of claim 1, wherein adjusting the intensity of the first data point comprises:
   determining a distance to the first data point;
   adjusting the intensity of the first data point based on the distance to create a distance-adjusted intensity of the first data point; and
   dividing the distance-adjusted intensity of the first data point by the cosine of the first angle of incidence.

6. The method of claim 1,
   further comprising determining a reflectivity associated with the object.

7. The method of claim 1, further comprising:
   receiving, at the computing device, lidar data indicative of the environment of the vehicle from a second lidar data source, wherein the lidar data includes a second plurality of data points indicative of locations of reflections from the environment and further includes a respective intensity for each data point;
   determining a second surface normal for at least a second data point of the second plurality of data points;
   determining a second angle of incidence for the second data point based on the second surface normal;
   adjusting the intensity of the second data point based on the second angle of incidence to create a second adjusted intensity for the second data point; and
   determining a correlation between the first adjusted intensity and the second adjusted intensity, wherein the correlation indicates that the first data point and the second data point are associated with a single surface.

8. The method of claim 7, further comprising determining at least one of (i) a calibration error and (ii) a sensor error based on the correlation.

9. The method of claim 1, further comprising:
   for each respective data point of the first plurality of data points:
      determining a respective surface normal for the respective data point;
      determining a respective angle of incidence for the respective data point based on the respective surface normal; and
      adjusting the respective intensity of the respective data point based on the respective angle of incidence to create a respective adjusted intensity for the respective data point; and
   creating an intensity-adjusted map based on the adjusted intensities of the first plurality of data points.

10. The method of claim 9, further comprising:
    performing object recognition based on the adjusted intensities of the first plurality of data points.

11. A system comprising:
    a first light detection and ranging (LIDAR) device configured to transmit laser signals into an environment and receive reflected laser signals from the environment, wherein the receive reflected laser signals comprise lidar data indicative of an environment of a vehicle and include a first plurality of data points indicative of locations of reflections from the environment and further includes a respective intensity for each data point;
    at least one processor; and
    a memory having stored thereon instructions that, upon execution by at least one processor, cause the system to perform functions, wherein the functions comprise:
       determining respective surface normals for the first plurality of data points, wherein determining the respective surface normals for the first plurality of data points comprises determining a first surface normal for a first data point of the first plurality of data points, wherein determining the first surface normal comprises:
          determining a first vector between the first data point and a first neighboring data point of the first plurality of data points;
          determining a second vector between the first data point and a second neighboring data point of the first plurality of data points;
          determining a cross product of the first vector and the second vector; and
          determining the first surface normal based on the cross product;
       determining a first angle of incidence for the first data point based on the first surface normal;
       adjusting the intensity of the first data point based on the first angle of incidence to create a first adjusted intensity for the first data point;
       associating a group of data points in the first plurality of data points with an object based on a similarity of the respective surface normals of the data points in the group;
       identifying the object based on the first adjusted intensity for the first data point and
       controlling the vehicle based on the identified object.

12. The system of claim 11, wherein the functions further comprise:
    determining a distance to the first data point;
    adjusting the intensity of the first data point based on the distance to create a distance-adjusted intensity of the first data point; and
    dividing the distance-adjusted intensity of the first data point by the cosine of the first angle of incidence.

13. The system of claim 11, further comprising:
    a second laser unit configured to transmit and receive laser signals; and
    wherein the functions further comprise:
       receiving, at the computing device, lidar data indicative of an environment of a vehicle from the second laser unit, wherein the lidar data includes a second plurality of data points indicative of locations of reflections from the environment and further includes a respective intensity for each data point;
       determining a second surface normal for at least a second data point of the second plurality of data points;
       determining a second angle of incidence for the second data point based on the second surface normal;
       adjusting the intensity of the second data point based on the second angle of incidence to create a second adjusted intensity for the second data point; and
       determining a correlation between the first adjusted intensity and the second adjusted intensity, wherein the correlation indicates that the first data point and the second data point are associated with a single surface.

14. The system of claim 11, wherein the functions further comprise determining at least one of (i) a calibration error and (ii) a sensor error based on the correlation.

15. The system of claim 11, wherein
    the functions further comprise determining a reflectivity associated with the object.

16. The system of claim 11, wherein the functions further comprise:
for each respective data point of the first plurality of data points:
determining a respective surface normal for the respective data point;
determining a respective angle of incidence for the respective data point based on the respective surface normal; and
adjusting the respective intensity of the respective data point based on the respective angle of incidence to create a respective adjusted intensity for the respective data point; and
creating an intensity-adjusted map based on the adjusted intensities of the first plurality of data points.

17. The system of claim 16, wherein the functions further comprise:
performing object recognition based on the adjusted intensities of the first plurality of data points.

18. A non-transitory computer readable medium having stored thereon executable instructions that, upon execution by a computing device, cause the computing device to perform functions comprising:
receiving, at a computing device, lidar data indicative of an environment of a vehicle from a first laser unit, wherein the lidar data includes a first plurality of data points each data point having a respective intensity;
determining respective surface normals for the first plurality of data points, wherein determining the respective surface normals for the first plurality of data points comprises determining a first surface normal for a first data point of the first plurality of data points, wherein determining the first surface normal comprises:
determining a first vector between the first data point and a first neighboring data point of the first plurality of data points;
determining a second vector between the first data point and a second neighboring data point of the first plurality of data points;
determining a cross product of the first vector and the second vector; and
determining the first surface normal based on the cross product;
determining an angle of incidence for the first data point based on the first surface normal;
adjusting the intensity of the first data point based on the angle of incidence to create a first adjusted intensity;
associating a group of data points in the first plurality of data points with an object based on a similarity of the respective surface normals of the data points in the group;
identifying the object based on the first adjusted intensity for the first data point and
controlling the vehicle based on the identified object.

19. The non-transitory computer readable medium of claim 18, wherein the functions further comprise:
for each respective data point of the first plurality of data points:
determining a respective surface normal for the respective data point;
determining a respective angle of incidence for the respective data point based on the respective surface normal; and
adjusting the respective intensity of the respective data point based on the respective angle of incidence to create a respective adjusted intensity for the respective data point; and
creating an intensity-adjusted map based on the adjusted intensities of the first plurality of data points.

20. The non-transitory computer readable medium of claim 19, wherein the functions further comprise:
performing object recognition based on the adjusted intensities of the first plurality of data points.

* * * * *